UNITED STATES PATENT OFFICE.

FREDERICK MARK BECKET, OF NIAGARA FALLS, NEW YORK, ASSIGNOR TO ELECTRO METALLURGICAL COMPANY, OF NEW YORK, N. Y., A CORPORATION OF WEST VIRGINIA.

REFRACTORY COMPOSITION.

1,244,688.     Specification of Letters Patent.     Patented Oct. 30, 1917.

No Drawing.     Application filed May 31, 1917. Serial No. 172,008.

*To all whom it may concern:*

Be it known that I, FREDERICK M. BECKET, a subject of the King of Great Britain, residing at Niagara Falls, in the county of Niagara and State of New York, have invented certain new and useful Improvements in Refractory Compositions, of which the following is a specification.

This invention relates to a refractory composition suitable for furnace linings or like purposes, and having as its principal ingredient the slag which is produced in the commercial manufacture of ferrochromium. A typical slag of this kind, the product of a furnace producing high-carbon ferrochromium, had the composition specified below in column I. Column II gives the usual range of components of such slags.

|  | I. | II. |
|---|---|---|
| $Cr_2O_3$ | 7.15% | 2 to 8% |
| FeO | 0.51% | 0.5 " 9% |
| $SiO_2$ | 17.80% | 12 " 25% |
| $Al_2O_3$ | 30.80% | 18 " 35% |
| MgO | 32.58% | 22 " 38% |
| CaO | 6.56% | 2 " 8% |
| MnO | 0.17% | 0 " 1% |
| $TiO_2$ | 0.33% | 0 " 1% |
| S | 0.33% | 0.1 " 0.8% |
| FeCr | 2.18% | 0 " 3% |

To produce a refractory in accordance with the present invention the solidified slag from the commercial ferrochromium manufacture may be ground or crushed to pass a screen having six to sixteen meshes per linear inch, the crushed material being in the form of a mixture of particles of various sizes. This crushed product may then be bonded, using for example a solution of sodium silicate or water glass. For this operation it has been found satisfactory to employ a water glass solution having a specific gravity of 1.1 to 1.3, in volume just sufficient for a thorough wetting of the particles, the wet mass being immediately consolidated and shaped under heavy pressures, for example in a standard brick machine or hydraulic press. Usually the sodium silicate solution will vary from four to seven per cent. by weight of the crushed slag, according to the density of the solution and the degree of pressure to be applied during the shaping.

Instead of water glass or other binder, bricks or blocks having sufficient strength for many purposes may be very simply prepared by wetting the particles with water and consolidated under heavy pressure as above. The ferrochromium slag possesses marked self-bonding qualities, sufficient to permit the use of this method.

In whatever way it may have been prepared and bonded, the brick or block may be merely air-dried or aged, and will acquire sufficient hardness and durability for some purposes; or it may be heated to a temperature sufficient to expel the free and chemically combined water of the silicate bond, say to dull redness; or the brick may be fired at any higher temperature up to or even exceeding that to which it will be subjected to in use in the furnace.

Instead of consolidating the particles into a brick, block or other shape, the crushed slag, mixed with water or sodium silicate solution or other bonding agent, may be tamped directly into place as a furnace lining or like element, being then dried out *in situ*, and subsequently fired in the furnace.

The above described refractory possesses marked advantages, among which the following are mentioned: It possesses a low coefficient of expansion in conjunction with a relatively high heat conductivity, as compared with the best firebrick. It is also capable of withstanding a materially higher temperature than the best firebrick, and is highly resistant to alkalis and basic slags. The block may be consolidated to a very high density, and is capable of withstanding considerable abrasion, permitting its use for example in such difficult situations as rotary lime kilns, coke-ovens, or the like.

While I have stated herein the usual range of slag compositions as produced in the normal operation of making ferrochromium, my invention contemplates the production of special slags to serve particular purposes, for example slags having more than the usual degree of defractoriness. This I accomplish either by the selection and mixing of ores, or by the addition of special fluxes to the charge, or by any combination of these methods. For example, the addition of magnesia to the charge will increase both the basicity and the refractory character of the slag, without interfering with the furnace operation by which the ferrochromium is produced. Hence the expression "ferrochromium slags," and equivalent expressions used herein, is intended to include both the normal ferrochromium slags and such special slags as may be formed by appropriate modification of the furnace-charge.

I claim:—

1. A refractory having as an essential component particles of ferrochromium furnace slag.

2. A refractory having as an essential component particles of slag derived from the manufacture of high-carbon ferrochromium.

In testimony whereof I affix my signature in presence of two witnesses.

FREDERICK MARK BECKET.

Witnesses:
MARY SCOPE,
D. BURGESS.

It is hereby certified that in Letters Patent No. 1,244,688, granted October 30 1917, upon the application of Frederick Mark Becket, of Niagara Falls, New York for an improvement in "Refractory Compositions," errors appear in the printed specification requiring correction as follows: Page 1, line 56, for the word "consolidated" read *consolidating;* same page, line 98, for the word "defractoriness" read *refractoriness;* and that the said Letters Patent should be read with these corrections therein that the same may conform to the record of the case in the Patent Office.

Signed and sealed this 20th day of November, A. D., 1917.

[SEAL.]

R. F. WHITEHEAD,

*Acting Commissioner of Patents.*

Cl. 106—9.